(12) United States Patent  (10) Patent No.: US 8,266,498 B2
Moyer  (45) Date of Patent: Sep. 11, 2012

(54) IMPLEMENTATION OF MULTIPLE ERROR DETECTION SCHEMES FOR A CACHE

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 756 days.

(21) Appl. No.: 12/415,672

(22) Filed: Mar. 31, 2009

(65) Prior Publication Data

US 2010/0251036 A1    Sep. 30, 2010

(51) Int. Cl.
 *G06F 11/00* (2006.01)
(52) U.S. Cl. .................................. 714/758; 714/763
(58) Field of Classification Search .............. 714/758, 714/763, 800, 52, 54, 43
See application file for complete search history.

(56) References Cited

U.S. PATENT DOCUMENTS

| | | | |
|---|---|---|---|
| 5,479,641 A * | 12/1995 | Nadir et al. .................. | 711/128 |
| 5,488,691 A | 1/1996 | Fuoco et al. | |
| 5,630,055 A | 5/1997 | Bannon et al. | |
| 5,848,293 A | 12/1998 | Gentry | |
| 5,958,068 A * | 9/1999 | Arimilli et al. ............... | 714/6.13 |
| 5,961,660 A | 10/1999 | Capps, Jr. et al. | |
| 6,092,182 A | 7/2000 | Mahalingaiah | |
| 6,253,273 B1 | 6/2001 | Blumenau | |
| 6,654,925 B1 | 11/2003 | Meaney et al. | |
| 6,804,763 B1 | 10/2004 | Stockdale et al. | |
| 6,804,799 B2 | 10/2004 | Zuraski, Jr. | |
| 6,829,698 B2 | 12/2004 | Arimilli et al. | |
| 7,124,170 B1 | 10/2006 | Sibert | |
| 7,254,748 B1 | 8/2007 | Wright et al. | |
| 7,643,638 B2 * | 1/2010 | Hepler .......................... | 380/268 |
| 2005/0188249 A1 * | 8/2005 | Hart et al. ......................... | 714/5 |
| 2005/0240745 A1 | 10/2005 | Iyer et al. | |
| 2005/0257025 A1 | 11/2005 | Spencer | |
| 2006/0075193 A1 * | 4/2006 | Magoshi ........................ | 711/122 |
| 2006/0248314 A1 * | 11/2006 | Barlow et al. ................... | 712/35 |
| 2007/0150671 A1 | 6/2007 | Kurland | |
| 2008/0071989 A1 * | 3/2008 | McNeill, Jr. .................. | 711/118 |
| 2008/0140962 A1 | 6/2008 | Pattabiraman et al. | |

FOREIGN PATENT DOCUMENTS

EP    0418457 B1    1/1997

OTHER PUBLICATIONS

U.S. Appl. No. 12/204,989, filed Sep. 5, 2008.
U.S. Appl. No. 12/205,210, filed Sep. 5, 2008.
U.S. Appl. No. 12/112,580, filed Apr. 30, 2008.
U.S. Appl. 12/205,222, filed on Sep. 5, 2008.

* cited by examiner

*Primary Examiner* — Dieu-Minh Le
(74) *Attorney, Agent, or Firm* — David G. Dolezal; Joanna G. Chiu

(57) ABSTRACT

A cache includes a plurality of cache lines, where each cache line includes a detection type field, corresponding cache data field, a detection field, and a corresponding tag field. The detection type field indicates an error detection scheme from a plurality of error detection schemes currently in use for the corresponding cache data field. One example of an error detection scheme is a multiple bit error detection scheme (e.g. an error detection coding (EDC) or an error correction coding (ECC)). Another type is a single bit error detection scheme (e.g. parity error detection). The detection bits field stores parity bits if parity error detection is used. The detection bits field stores checking bits if EDC coding is used.

20 Claims, 7 Drawing Sheets

CACHE CONTROL REGISTER

IMPLEMENTATION OF MULTIPLE ERROR DETECTION SCHEMES FOR A CACHE

BACKGROUND

1. Field

This disclosure relates generally to data processing systems, and more specifically, to implementation of multiple error detection schemes for a cache.

2. Related Art

Caches are typically used in data processing systems to store multiple types of information, such as instruction information and data information (e.g. operand information). Error detection schemes can be used to protect information in a cache for improved reliability. Error detection code (EDC), error correction code (ECC), and parity detection schemes are commonly used to protect information providing error detection and (with some schemes such as ECC) error correction for memories. Single bit error detection schemes such as e.g. a Parity detection scheme can be used to detect one error bit in a field of information wherein multiple bit error detection schemes such as e.g. EDC and ECC detection schemes can be used to detect multiple bit errors. However EDC and ECC codes detection schemes are more complex, and in some embodiments, utilize more bits for error detection than the bits of the data unit. Accordingly, cache performance may be reduced with the use of EDC/ECC detection schemes over the use of parity schemes.

A data system may include certain types of information where a higher emphasis on error detection is desired and a decrease in performance may be acceptable. For other types of information, error detection requirements may not be as stringent and the sacrifice in performance may not be as acceptable. What is needed is an improved data processing system.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one embodiment, a data processing system includes a cache with the capability of multiple detection schemes to be utilized on information stored in a cache data field. In one embodiment, each line of a cache includes a detection type flag field for containing information that indicates whether the information in the cache storage unit such as a cache line is protected with a multiple bit error detection scheme such as an EDC/ECC type detection scheme or a single bit error detection scheme such as a parity detection scheme. The data processing system utilizing the flag in performing cache look up for instruction fetches, data reads and data writes. Accordingly, the data processing system may be able to use higher detection/lower performance schemes for some cache information and lower detection/higher performance for other cache information.

As used herein, the term "bus" is used to refer to a plurality of signals or conductors which may be used to transfer one or more various types of information. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Figure 1:
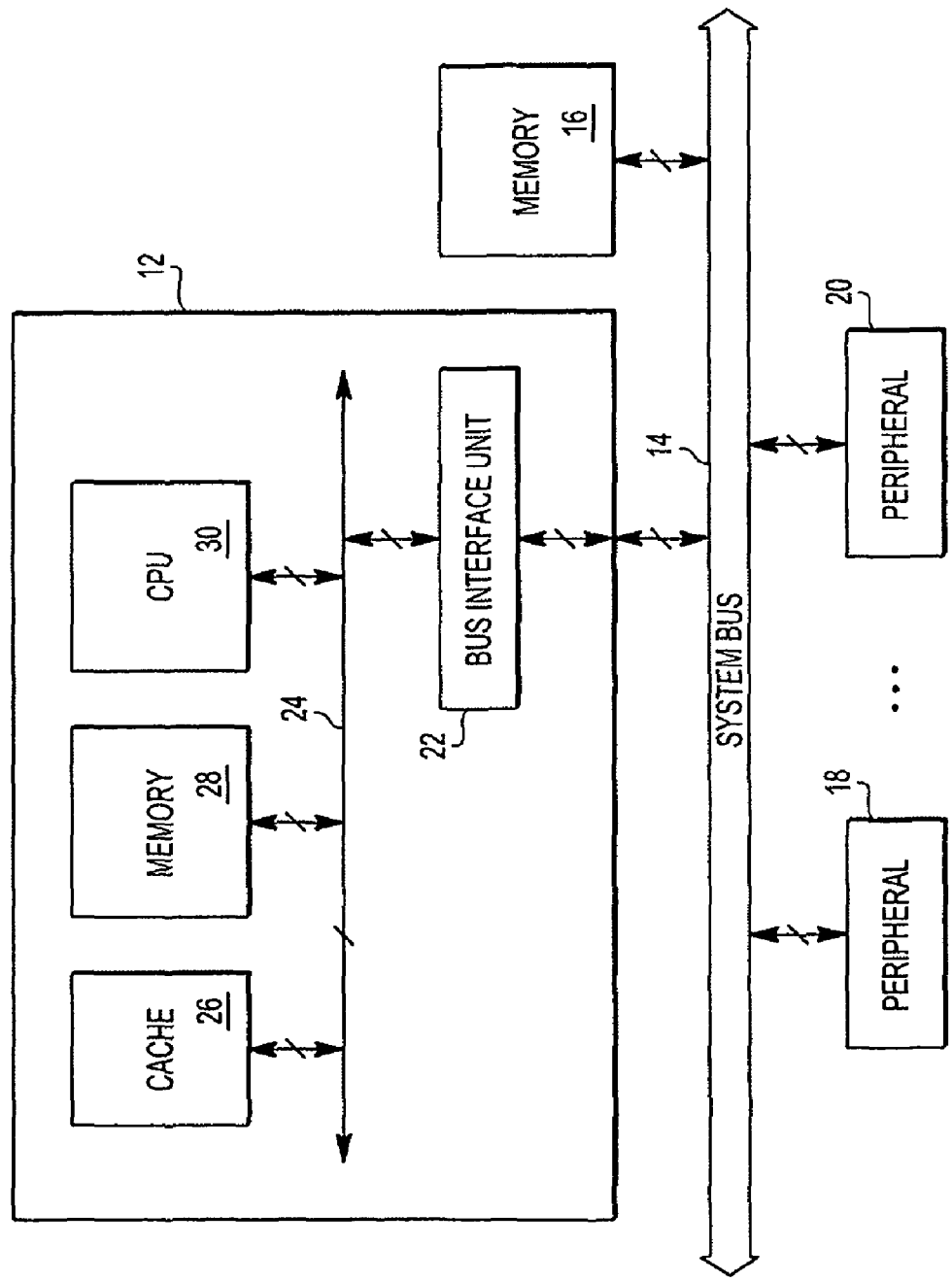
FIG. 1 illustrates in block diagram form a data processing system in accordance with one embodiment of the present invention.

FIG. 1 illustrates, in block diagram form, a data processing system 10 in accordance with one embodiment of the present invention. Data processing system 10 includes a processor 12, a system bus 14, a memory 16, and a plurality of peripherals such as peripheral 18, peripheral 20 and, in some embodiments, additional peripherals as indicated by the dots in FIG. 1 separating peripheral 18 from peripheral 20. The memory 16 is a system memory that is coupled to the system bus 14 by a bidirectional conductor that, in one form, has multiple conductors. In the illustrated form, each of peripherals 18 and 20 is coupled to the system bus 14 by bidirectional multiple conductors as is the processor 12. Processor 12 includes a bus interface unit 22 that is coupled to the system bus 14 via a bidirectional bus having multiple conductors. The bus interface unit 22 is coupled to an internal bus 24 via bidirectional conductors. The internal bus 24 is a multiple-conductor communication bus. Coupled to the internal bus 24 via respective bidirectional conductors is a cache 26, a memory 28, and a central processing unit (CPU) 30. CPU 30 implements data processing operations. Each of cache 26, memory 28, and CPU 30 are coupled to the internal bus via respective bidirectional conductors. Note that memory 28 and memory 16 can be any type of memory for storing information for a data processing system, and peripherals 18 and 20 can each be any type of peripheral or device. In one embodiment, all of data processing system 10 is on a single integrated circuit. Alternatively, data processing system 10 can be implemented using more than one integrated circuit. In one embodiment, at least all of processor 12 is on a single integrated circuit. In alternate embodiments, CPU 30 may be any type of processing element, such as a DSP, or an intelligent I/O processor, or any other type of processing element.

In operation, the processor 12 functions to implement a variety of data processing functions by executing a plurality of data processing instructions. Cache 26 is a temporary data store for frequently-used information that is needed by CPU 30. In one embodiment, cache 26 is a set-associative unified cache which is capable of storing multiple types of information, such as instruction information and data information (e.g. operand information). Cache 26 may be another type of cache in other embodiments such as a data cache or an instruction cache.

Information needed by CPU 30 that is not within cache 26 is stored in memory 28 or memory 16. In one embodiment, memory 28 may be referred to as an internal memory where it is internal to processor 12, while memory 16 may be referred to as an external memory where it is external to processor 12. Bus interface unit 22 functions to coordinate the flow of information related to instruction execution by CPU 30. Control information and data resulting from the execution of instructions are exchanged between CPU 30 and system bus 14 via bus interface unit 22.

Data processing system 10 may have other configurations in other embodiments. For example, system 10 may have multiple processors and memories in other embodiments. System bus 14 may be any type of interconnect structure such as a ring, crossbar, point-to-point network, or another structure type for transferring information between the various elements of system 10.

Figure 2:
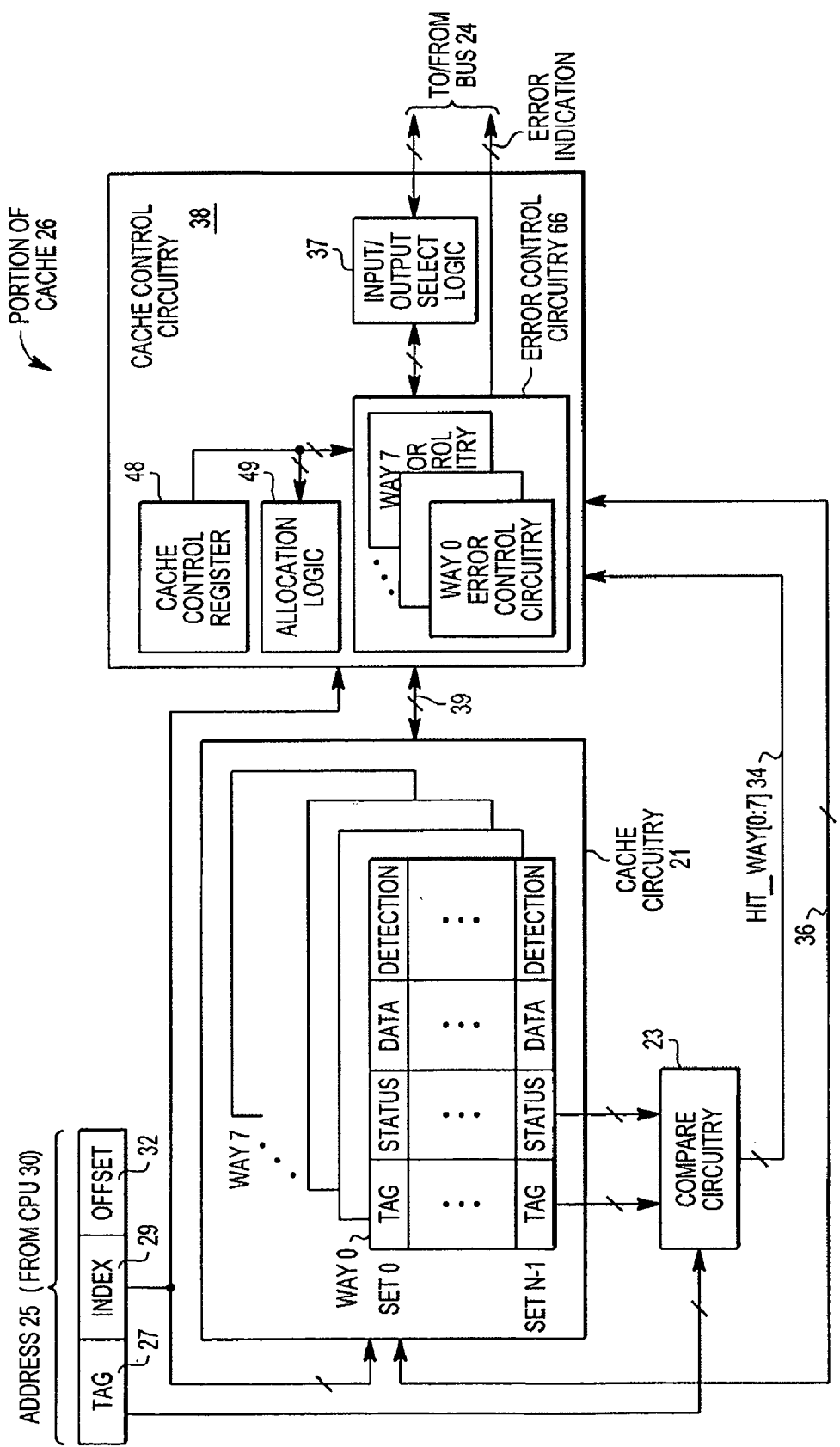
FIG. 2 illustrates in block diagram form a portion of a cache within the data processing system of FIG. 1 in accordance with one embodiment of the present invention.

FIG. 2 illustrates a portion of cache 26 of FIG. 1 in accordance with one embodiment. Alternate embodiments of cache 26 may use a different structure than that illustrated in FIG. 2. The portion of cache 26 illustrated in FIG. 2 has "N" sets and 8 ways, and may be referred to as a multi-way unified cache or as a multi-way set-associative unified cache. Therefore, in the embodiment shown, cache 26 can be described as having N sets, each set having 8 ways. Cache 26, in alternate embodiments, may have any number of sets and any number of ways. Note that, as used herein, a cache line refers to an intersection of a cache way and a set. For example, way 0 includes N cache lines, each corresponding to one of set 0 to set N−1. Therefore, when a way is selected for replacement, the information in one or more cache lines (which is selected by index portion 29, as will be described below) is actually replaced. That is, the entire way may not be replaced, but only one or more particular lines or entries.

In the illustrated embodiment, cache circuitry 21 is storage circuitry which stores information in each of a plurality of cache lines or entries. For example, cache circuitry 21 includes tag, status, cache data, and detection fields for the cache lines or entries. See the description of FIG. 4. Address 25 is provided from CPU 30. In the embodiment shown, address 25 includes a tag portion 27, an index portion 29, and an offset portion 32. Index portion 29 is provided to cache circuitry 21 which indicates a particular cache line or entry (i.e. one of set 0 to set N−1). Compare circuitry 23 is coupled to receive tag portion 27 and is coupled to cache circuitry 21 to receive tag and status information. Based on this received information, compare circuitry 23 determines whether there has been a cache hit or a cache miss. In the illustrated embodiment, a plurality of hit/miss signals labeled HIT_WAY[0:7] 34 are provided to cache control circuitry 38. Each HIT_WAY [0:7] 34 signal indicates whether or not there has been a cache hit for its corresponding way in cache circuitry 21. Alternate embodiments may use a cache miss signal in addition to or instead of a cache hit signal. Also, alternative embodiments may utilize different techniques or different circuitry for detecting a cache hit or miss.

Cache control circuitry 38 is coupled to cache circuitry 21 by way of conductors 36 and 39. Index portion 29 is also provided to the cache control circuitry 38 for indicating a particular cache line or entry (i.e. one of set 0 to set N−1) Cache control circuitry 38 includes a cache control register 48, allocation logic 49, input/output select logic 37, and error control circuitry 66. Cache control register 48 is coupled to allocation logic 49 and error control circuitry 66, and error control circuitry 66 is coupled to input/output select logic 37. Error control circuitry 66 may also provide one or more error indicators to bus 24. Input/Output select logic 37 provides and receives information with bus 24.

In the illustrated embodiment, cache circuitry 21 is a unified cache which is capable of storing multiple types of information. That is, the cache data field of each cache line may store instruction information or data information (e.g. operand information). Furthermore, each way of cache circuitry 21 can be allocated to store a particular information type. For example, each way can be configured independently to store instruction information, data information (e.g. operand information), or both instruction and data information. In one embodiment, one or more of the ways of cache circuitry 21 can be configured to store read-only data information or modifiable data information.

In one embodiment, cache control register 48 includes bit fields that control the type of information that may be stored in each way, such as whether the way is available to store instruction miss line fills or data miss line fills.

Although one type of architecture for cache 26 has been illustrated in FIG. 2, alternate embodiments of cache 26 may use any desired or appropriate architecture. The architecture illustrated in FIG. 2 is merely intended to be one possible representative architecture.

Referring back to FIG. 2, in operation, index portion 29 is used to select a set in cache circuitry 21. The tag information from cache circuitry 21 is compared to tag portion 27 and qualified by status information (e.g. valid bits) from cache circuitry 21. The result of the compare and qualification (e.g. match and valid) determines whether or not a cache hit occurs. As described above, each HIT_WAY[0:7] 34 signal indicates whether or not there has been a cache hit for its corresponding way in cache circuitry 21.

In the case of a read access to cache 26, upon a cache hit, the cache data and detection bits fields of the cache line which resulted in the cache hit are provided, via conductors 39, to cache control circuitry 38. The corresponding error control circuitry within error control circuitry 66 for the way which resulted in the cache hit performs error detection and/or correction on the received cache data using the received detection information. The error detection and/or correction scheme (e.g. EDC/ECC or Parity) used is selected using a detection type flag associated with the information unit being provided from a specific cache entry. The cache data can then be provided to bus 24 via input/output select logic 37 which, using HIT_WAY[0:7] 34, selects the output of the corresponding error detection circuitry within error control circuitry 66 for the way which resulted in the cache hit. Also, note that an error indicator can also be provided to bus 24 via input/output select logic 37 to indicate whether or not an error has occurred. Note that if error correction is also being performed, then the corrected cache data will be output via input/output select logic 37 rather than the data provided directly from cache circuitry 21. Furthermore, if corrected cache data is being provided, the error indicator may be negated to indicate that there is no error with the cache data being provided (since it has been corrected).

In the case of a write access to cache 26, upon a cache hit, information (e.g. the information for storage into cache circuitry 21) can be received from bus 24 by select logic 37. The information can be provided by cache control circuitry 38 for storage into the appropriate cache line of cache circuitry 21 via conductors 39. Also, cache control circuitry 38 can appropriately update the status field (including the detection type flag) of the cache line. (Note that the specific circuitry used to receive the information and route it to the line within cache circuitry 21 which caused the hit and to update the status information is not illustrated, since it is well understood in the art.) The received information is also provided to error control circuitry 66 so that the corresponding error control circuitry within error control circuitry 66 (as selected by HIT_WAY[0: 7] 34) can generate the appropriate detection information to implement an EDC/ECC type detection scheme or a parity type detection scheme. This corresponding detection information may also be provided, along with the received information, by cache control circuitry 38 for storage into the appropriate cache line of cache circuitry 21 which resulted in the cache line hit. Note that if error correction is also being performed, then the corrected received information (if an error was detected) will be provided for storage into cache circuitry 21.

In the case of a cache miss, allocation logic 49, using information from control register 48, identifies a cache line for replacement and updates the cache line. Any known method of cache allocation can be used to select a cache line for replacement, such as, for example, a round robin method, a pseudo-least recently used (PLRU) method, etc. Allocation logic 49 combines the replacement method with the information from control register 48 to select a way for replacement which is enabled to be allocated for a particular type of information. Upon a cache miss, the new information for storage into the newly allocated cache line is provided to cache control circuitry 38 by bus 24. The new information can then be provided for storage into the newly allocated cache line of cache circuitry 21 via conductors 39. Also, cache control circuitry 38 can appropriately generate the status information for storage into the status field of the newly allocated cache line. (Note that the specific circuitry used to receive the information and route it to the newly allocated cache line within circuitry 21 and to generate the status information for the newly allocated cache line is not illustrated, since it is well understood in the art). The new information is also provided to error control circuitry 66 so that the corresponding error control circuitry within error control circuitry 66 (corresponding to the way selected by allocation logic 49 which includes the newly allocated cache line) can generate the appropriate detection information, as will be described in more detail. This corresponding detection information may also be provided, along with the received information, by cache control circuitry 38 for storage into the newly allocated cache line of cache circuitry 21. Note that if error correction is also being performed, then the corrected new information (if an error was detected) will be provided for storage into cache circuitry 21.

In the illustrated embodiment, cache control circuitry 38 also provides control signals on conductors 36 to cache circuitry 21 (e.g. for read/write control). For example, cache control circuitry 38 may, under control of CPU 30, update cache circuitry 21. For example, CPU 30 may execute special cache instructions to update status information. Also, in one embodiment, cache control circuitry 38, under control of CPU 30, such as via special cache instructions, may update control register 48 to change how the ways of cache circuitry 21 are allocated. Although FIG. 2 illustrates specific circuitry that may be used to implement a portion of cache 26 of FIG. 1, alternate embodiments may use any desired circuitry. A wide variety of circuit implementations may be used. The circuitry illustrated in FIG. 2 is merely intended to illustrate one possible embodiment.

Figure 3:
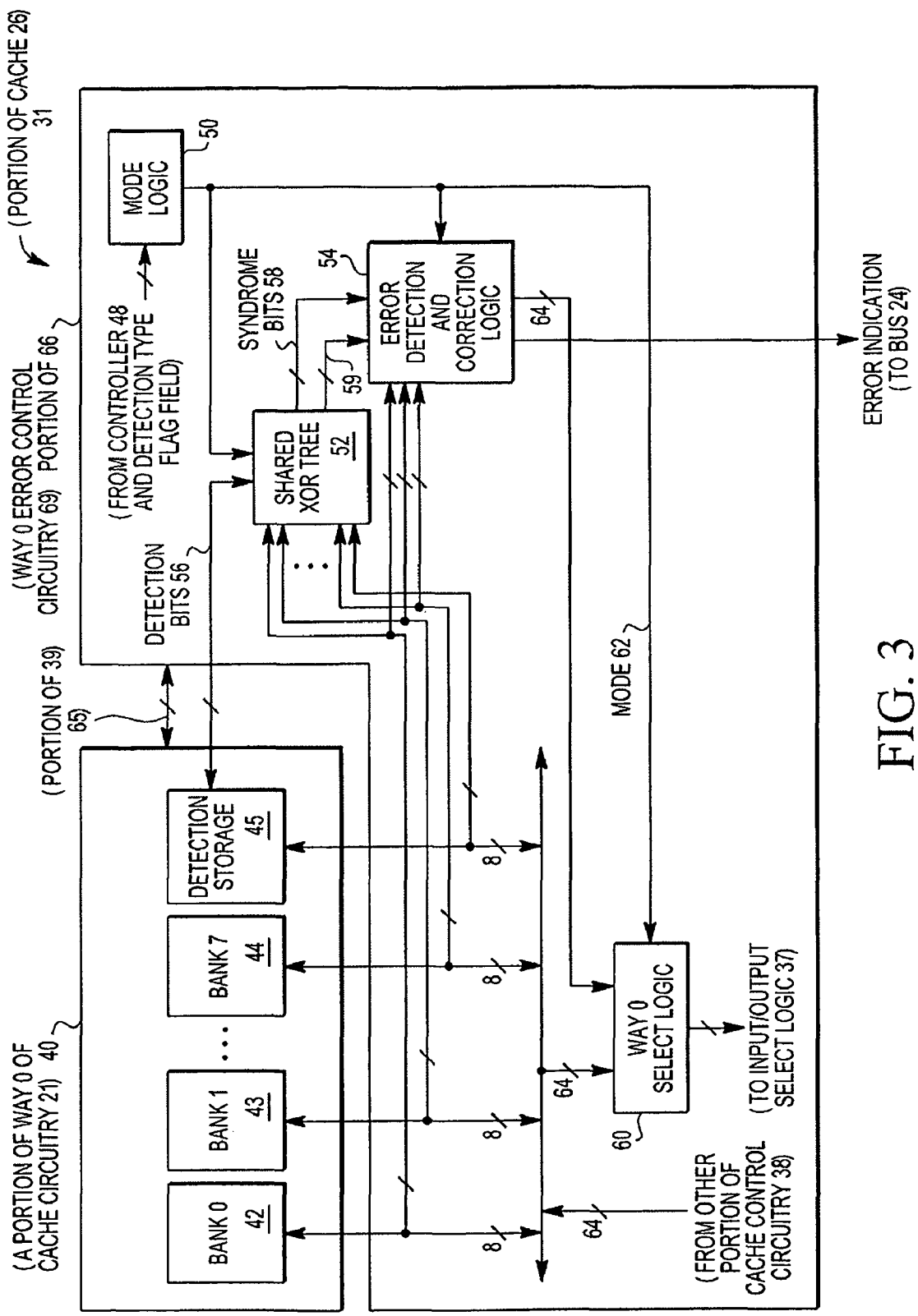
FIG. 3 illustrates in block diagram form, a portion of the cache of FIG. 2 in accordance with one embodiment of the present invention.

FIG. 3 illustrates circuitry 31, which represents a portion of cache 26 in accordance with one embodiment of the present invention. Circuitry 31 includes memory storage circuitry 40, which represents a portion of way 0 of cache circuitry 21. Memory storage circuitry 40 includes a number of memory banks and detection storage 45. In the illustrated embodiment, memory storage circuitry 40 includes 8 banks: bank 0 42, bank 1 43, . . . , bank 7 44. Alternate embodiments may include any number of banks. In the illustrated embodiment, banks 0-7 represent a cache data portion of way 0, where each bank is 1 byte wide, and detection storage 45 represents the detection portion of way 0. Each of banks 0-7 stores N bytes, one byte corresponding to each of sets 0 to N−1. Therefore, in the illustrated embodiment, having 8 banks, each cache data field of way 0 stores a doubleword. If each cache data field of way 0 were to store more than a doubleword, circuitry 40 would include more banks, as needed, and a larger detection storage, as needed. Note also that the description herein of FIG. 3 applies analogously to each of ways 0-7.

Circuitry 31 includes way 0 error control circuitry 69, which is a portion of error control circuitry 66. Way 0 error control circuitry 69 is bi-directionally coupled to memory storage circuitry 40 (to the portion of way 0 cache circuitry 21) and includes way 0 select logic 60, mode logic 50 (which is coupled to receive information from control register 48 and from the detection type flag field (see FIG. 4) of the cache line being written to or read from), a shared exclusive-OR (XOR) tree 52, and error detection and correction logic 54. Mode logic 50, based on the value of the way 0 allocation control field of allocation control register 48 and the detection type flag, outputs a mode indicator 62 to a control input of way 0 select logic 60. In one embodiment, mode indicator 62 indicates what error detection mode circuitry 31 is operating in. For example, in the illustrated embodiment, based on the value of the way 0 control field in control register 48 and the detection type flag field of the cache line being written to or read from, mode indicator 62 indicates whether circuitry 31 is operating in an EDC/ECC mode (multi-bit error detection/ error detection and correction) or in a parity mode (single bit error detection). In one embodiment, when the detection type flag is 1, mode indicator 62 indicates an EDC/ECC mode for a cache data field of the cache line. When the detection type flag is 0, mode indicator 62 indicates a parity mode for a cache data field of the cache line.

For example, in the case of a line in way 0 storing data type information, it may not be desirable to perform a read-modify-write (RMW), as is done in EDC/ECC mode. Therefore, a parity error detection mode may be sufficient. Also, in one embodiment, if a line in way 0 is allocated for read only data type information, mode logic 50 may also set mode indicator 62 to indicate an EDC/ECC mode, based on the received detection type flag field.

The detection storage 45 stores either parity bits or check bits for a particular cache line of banks 0-7 depending upon whether the detection type flag field of that line indicates an EDC/ECC detection scheme or a parity detection scheme. If an EDC/ECC detection scheme is indicated, an entry of detection storage 45 stores corresponding check bits for the corresponding entry within banks 0-7. For example, the first entry of detection storage 45 stores the check bits corresponding to the information stored in the first entry of each of banks 0-7. If a parity detection scheme is indicated, an entry of detection storage 45 stores a parity bit corresponding to an entry in each of banks 0-7. For example, in parity mode, the first entry of detection storage 45 stores a parity bit for the first entry in each of banks 0-7, Therefore, in the illustrated embodiment in which there are 8 banks, each entry of detection storage 45 stores 8 bits of parity, one for each of banks 0-7.

Shared XOR tree 52 is coupled to receive information from each of bank 0 through bank 7 and from detection storage 45. In an EDC/ECC mode, when updating a cache line, shared XOR tree 52, based on information received from other portions of cache control circuitry 38 (which may come from bus 24), or from a particular entry in each of banks 0-7, or a combination of both, generates check bits for EDC/ECC detection and supplies these values (detection bits 56) which are then provided to detection storage 45 for storage in a corresponding entry. Also, in an EDC/ECC mode, as determined by the stored value of the detection type flag field for a cache line, when reading from a cache line, shared XOR tree 52, based on information received from a particular entry in each of banks 0-7 and corresponding check bits from detection storage 45, generates syndrome bits 58 which are provided to correction logic 54. In an EDC/ECC mode, correction logic 54 also receives the information from the particular entry in each of banks 0-7 and uses the corresponding syndrome bits 58 to perform multi-bit error detection, and optionally (for embodiments implementing ECC) correct the received information and provide the corrected information from the particular entry of banks 0-7 to way 0 select logic 60. Therefore, way 0 select logic 60, based on the value of mode indicator 62, either provides the output of correction logic 54 to input/output select logic 37 (if in ECC mode) or the output of one or more of banks 0-7 directly to input/output select logic 37 (if in EDC or parity mode). Note that the selection of the type of detection mode is selected based on the type of error detection (e.g. single bit or multiple bit error detection) to be provided for an individual cache line within way 0 (and analogously in ways 1-7), and may differ for each individual line within the way.

When a cache hit occurs in way 0, input/output select logic 37 selects the output of way 0 select logic 60 to provide to bus 24. Note that in parity mode, the corresponding parity bits may also be provided to input/output select logic 37 from detection storage 45. Also, error detection and correction logic 54 may provide an error indicator to bus 24 to indicate whether or not an error occurred.

Note that in one embodiment, in an EDC mode, only error detection is performed. In this case, multiple bit errors are detected, but the errors are not corrected prior to being output to input/output select logic 37. In this case, the error indicator can be asserted to indicate an error since the error was not corrected. Also in this case, error detection and correction logic 54 may be referred to as error detection logic, and the output of error detection logic need not be provided to way 0 select logic 60. That is, in this embodiment, way 0 select logic 60 may not be needed since the uncorrected bits can be provided directly from banks 0-7.

In the embodiment shown, for a cache hit read operation in parity mode, the parity calculation for the cache hit read is generated by shared XOR tree 52 based on data received from each of banks 0-7 and detection storage 45 and provided to logic 54 (via the line 59). Error detection and correction logic then performs error detection on the cached information with the parity information to detect an error in the cache data. Mode logic 50 will set mode indicator 62 to indicate parity mode to way 0 select logic 60, which then selects the output of storage circuitry 40 to be provided to input/output select logic 37. Mode logic uses the stored detection type flag field for the cache line to make the determination of the type of error checking to be performed for the selected line within way 0, and provides this information to shared XOR tree 52 and to way 0 select logic 60. Shared XOR tree 52 then calculates the parity information for each of banks 0-7 based on receiving a mode indicator indicating parity mode from mode logic 50. If an error is detected, then an error indication is generated to bus 24. If no error is detected, then the cached information is provided to bus 24 by select logic 37.

For a cache hit read operation in ECC mode, select logic 60 provides the output of error detection and correction logic 54 to select logic 37. For a cache hit read operation in EDC/ECC mode, the syndrome calculation for the cache hit read is generated by shared XOR tree 52 based on data received from each of banks 0-7 and detection storage 45 and provides this information to logic 54 (via the line 58). Error detection and correction logic then performs error detection on the cached information with the syndrome information to detect and optionally correct an error in the cache data. Mode logic 50 will set mode indicator 62 to indicate EDC/ECC mode to way 0 select logic 60 based on the stored value of detection type flag field for the accessed cache line within way 0, which then selects the output of Error detection and correction logic 64 to be provided to input/output select logic 37. Mode logic uses the stored detection type flag field for the cache line to make the determination of the type of error checking to be performed for the selected line within way 0, and provides this information to shared XOR tree 52, error detection and correction logic 64, and to way 0 select logic 60. Shared XOR tree 52 then calculates the syndrome information for each of banks 0-7 based on receiving a mode indicator indicating EDC/ECC mode from mode logic 50.

For a cache hit write operation in parity mode or a cache allocation operation performed upon a cache miss in parity mode, the write data is provided to an entry in one or more of banks 0-7 which is addressed by the write operation access address. That is, a write may be performed to any number of banks in banks 0-7, based on the size of the write operation, and the corresponding parity bits in the corresponding entry of detection storage 45 also get updated on a per-bit basis after generation in shared XOR tree 52. In this manner, if only one bank is written to as a result of the write operation, then only one bit in the corresponding entry of detection storage 45 is updated.

For a full write operation in EDC/ECC mode in which all of banks 0-7 are written to (i.e. in which the full cache data field is written to), a read-modify-write (RMW) operation need not be performed. In this manner, a full write operation (a write to all banks of memory storage circuitry 40) can be performed with one or a single access (e.g. in a single processor cycle or a single clock cycle). In this case, the write information is provided to each entry of banks 0-7 addressed by the full write operation access address. The write information is also provided to shared XOR tree 52 which generates the corresponding check bits and provides them via detection bits 56 to detection storage 45 for storage in the corresponding entry. In one embodiment, shared XOR tree 52 is combinational logic where the generation and write back of the check bits can be completed in the same processor or clock cycle as the write of the write data to banks 0-7.

For a partial write operation in EDC/ECC mode, in which less than all of banks 0-7 is written to, a read-modify-write (RMW) is needed. Therefore, performing a write operation to less than all of banks 0-7 (i.e. to less than the full cache data field) requires multiple accesses (e.g. multiple processor cycles or clock cycles), and cannot be performed with a single access as is the case for a full write operation. Due to the complexity of implementing the read-modify-write operation, write operations to less than all banks 0-7 may not be supported in some embodiments. Thus, in these embodiments, for writeable data, parity detection may be selected, while for instruction information, or for read-only data information, which is only written when updating all of banks 0-7 on a cache miss, multi-bit EDC/ECC may be selected, with the information stored into the value of the detection type flag field.

Selection of the type of detection scheme used for instructions, writeable data, and read-only data may be hardwired, or may be user programmable. In one embodiment, instructions and read-only data utilize more robust EDC/ECC multi-bit error coding schemes, and writeable data uses parity detection, in order to avoid read-modify-write operations to update the error detection bits on a partial-width write of data. In an alternate embodiment, the selection of the types of error detection for each of these data elements may be user programmable, such as by using control fields stored in a control register, such as cache control register 48 of FIG. 5.

In the embodiment shown, a parity bit is generated by XORing the 8 bits of a byte data unit of cache data. On the other hand, an EDC detection scheme involves a more complex operation where more bits of cache data are XORed to generate check bits for the same byte of cached information. Accordingly, in some embodiments, to update a portion of a cache line (e.g. 8 bits), a greater portion of the cache line may have to be read to generate the check bits with an EDC scheme. Accordingly, where a smaller portion of a cache data field (e.g. 8 bits) is to be updated, it may be desirable to use parity detection as opposed to EDC detection such that only the updated bits have to be read to generate a new parity bit for the line.

In the embodiment of FIG. 3, an EDC/ECC scheme is utilized such that a portion of the check bit generation scheme includes XORing the 8 bits of cache data that would be XORed to generate the parity bit for those 8 bits. With such an EDC/ECC scheme, the "parity bit" would then be XORed with other bits of the cache data to generate the check bits. With such an embodiment, the same XOR tree may be used to generate both the parity bits for a parity detection scheme and the check bits for an EDC detection scheme. However, other embodiments may include two different XOR trees for generating the different detection bits.

In other embodiments, a cache may have other configurations, and may perform information accesses and error detection schemes by other methods.

Figure 4:
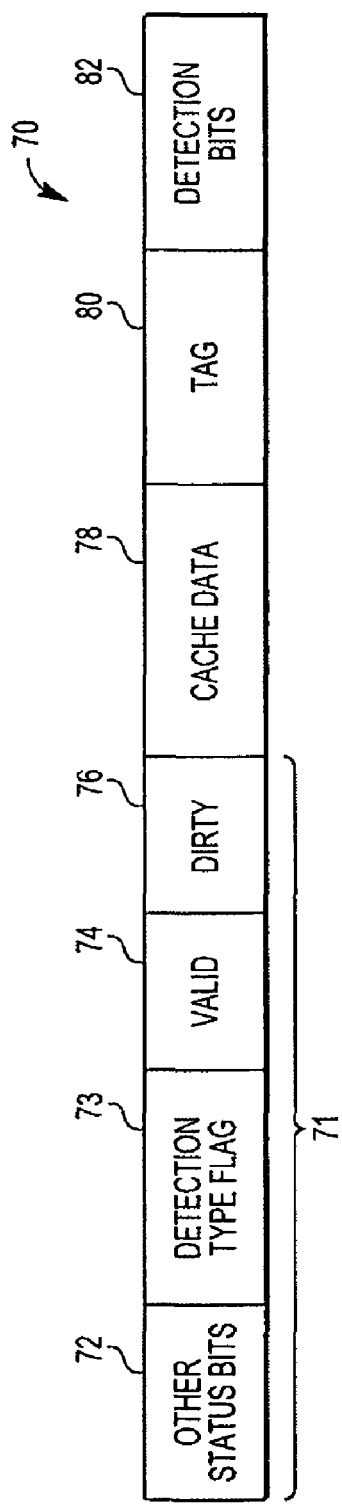
FIG. 4 illustrates, in diagrammatic form, a cache line including various fields in accordance with one embodiment of the present invention.

FIG. 4 is a field diagram of a cache line according to one embodiment of the present invention. Cache line 70 is similar to the cache lines shown in FIG. 2 for cache circuitry 21. Cache line 70 includes a status field 71, a cache data field 78, a tag field 80, and detection bits field 82. The status field 71 includes a detection type flag field 73, the valid bit field 74, dirty bit field 76, and other status bit field 72. The detection bits field stores either parity bits or check bits depending upon whether the detection type flag field 73 indicates that parity detection is being used for cache data field 78 or EDC/ECC detection is being used for cache data field 78.

In one embodiment, field 73 is one bit to differentiate between the use of an EDC/ECC detection scheme and a parity detection scheme. However, in other embodiments, the detection type field may include a greater number of bits.

In one embodiment, the cache data field 78 64 bits and the number of detection bits is 8. However, other embodiments may include a different number of bits and may have different bit fields, such as a group of four 64-bit doublewords in cache data field 78, and four sets of eight check bits in detection bits 82, each set of eight check bits corresponding to a doubleword (64-bits) of information stored within the cache line, allowing for single bit error correction, and double-bit error detection (SECDED) or any other configuration. In one embodiment, cache data field includes a byte from each bank of a way (see the discussion of FIGS. 2 and 3). The cache data field 78 can be used to store data information or instruction information. In one embodiment, the detection bits field 82 is implemented in the detection storage 45 (see FIG. 3). In one embodiment, cache line 70 is physically implemented in a single row of a memory array. However, in other embodiments, a cache line may be physically implemented in different locations of a memory array or in multiple memory arrays. For example, each byte of a cache data field may be physically implemented in a different row of a memory array, maybe separated by bytes of a different cache lines, or may be implemented in different arrays. Also, detection bits field 82 may be physically implemented in a different memory array from the cache data field 78 and/or from the status bit fields 71.

Figure 5:
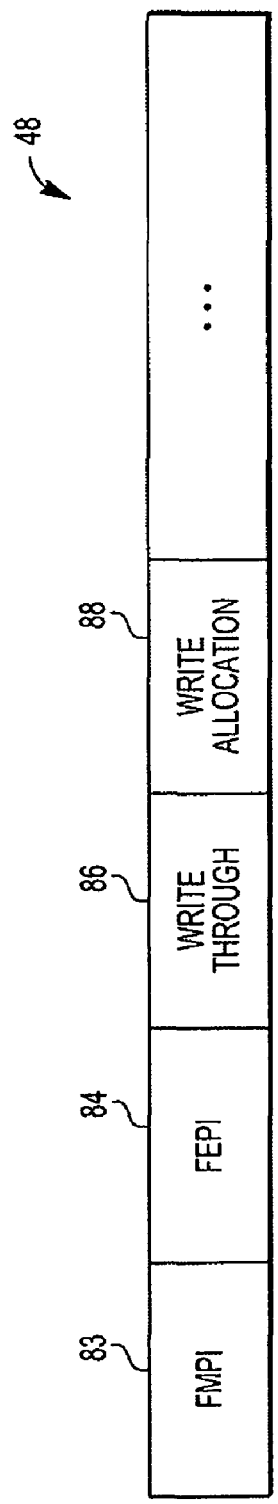
FIG. 5 illustrates, in diagrammatic form, an allocation control register for use with the cache of FIGS. 2 and 3 in accordance with one embodiment of the present invention.

FIG. 5 is a field diagram of control register 48. Control register 48 includes bit fields 83, 84, 86, and 88 for controlling modes of cache control circuitry 38. FEPI bit field 84 controls whether control circuitry 38 forces an exception when parity is indicated by the detection indication field 73 for a cache hit on an instruction fetch. FMPI bit field 83 controls whether control circuitry 38 forces a miss when parity is indicated by the detection indication field 73 for a cache hit on an instruction fetch. Forcing an exception by setting FEPI to '1', or forcing a miss by setting FMPI to '1' when parity is being used for a cache line which contains instructions may be used to warn software or to force the instruction to be obtained external to cache 26, such that a higher assurance that no multi-bit errors are present in the cached instruction values. In one embodiment, instruction misses cause reloaded lines to be placed into the cache using EDC/ECC detection, thus the presence of a stored error detection type flag indicating parity is not normally expected, and may indicate that the stored flag has encountered an error, or that the detection may have been subsequently downgraded by a data write as will be explained later. By forcing a miss in the case of an instruction fetch hit to a line with a stored detection type flag indicating parity, more robust data may be obtained external to cache 26, such as from memory 28 or memory 16, which may be implemented using multi-bit error detection and correction detection schemes. Bit field 86 indicates whether control circuitry 38 requires a write through for data writes to a cache. Bit field 88 indicates whether write allocation is enabled for data write misses to the cache. Register 48 may include other fields for the control of circuitry 38 in other embodiments.

Figure 6:
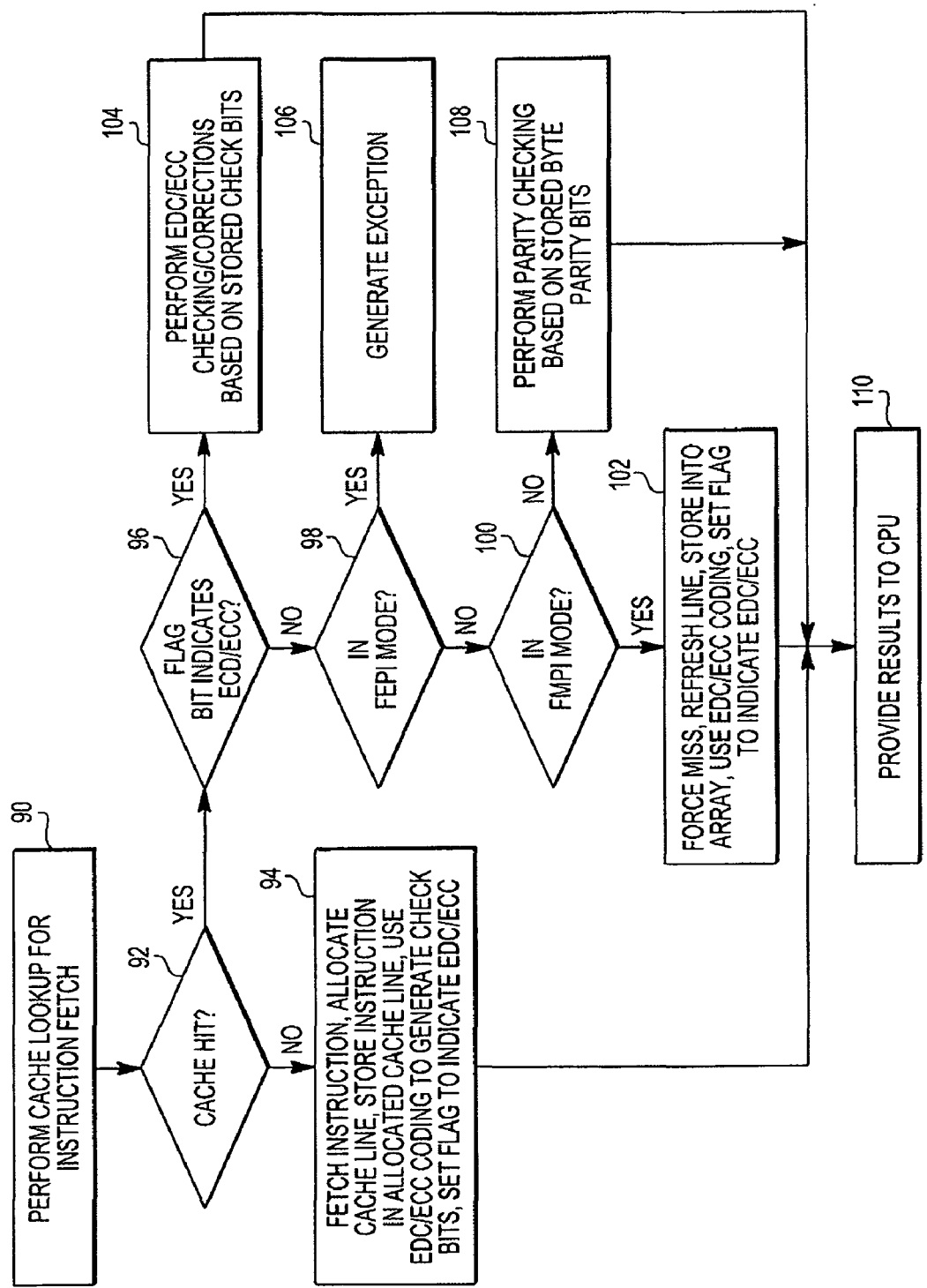
FIG. 6 illustrates a flow diagram of the operations of a data processing system for a cache lookup for an instruction fetch in accordance with one embodiment of the present invention.

FIG. 6 is a flow diagram of the operations of data processing system 10 in performing a cache look up for an instruction fetch issued by CPU 30 and received via bus 24. In decision 92, compare circuitry 23 and cache control circuitry 38 determine whether the instruction fetch generates a cache hit. If no in decision 92, CPU 30 fetches the instruction from memory 16 or memory 28 in operation 94. Also in operation 94, a cache line of cache circuitry 21 is allocated, the instruction is stored in a cache data field of the allocated line, and an EDC/ECC coding scheme is used to generate check bits from the instruction. The check bits are stored in detection bits field (field 82) of the allocated cache line, and the detection type flag (field 73) is set to EDC/ECC for the allocated cache line. The instruction is provided to CPU 30 in operation 110.

If there is a cache hit in decision 92 (the instruction is found in cache 26) and the detection type flag field is set to EDC/ECC (as determined in decision 96), EDC detection and (in some embodiments) ECC correction is performed by tree 52 and logic 54 on the instruction in cache 26 in operation 104. In one embodiment, the EDC detection is performed on all of the bits needed to determine if there is an error. This may be more bits than the actual instruction in some embodiments. The instruction is provided to CPU 30 in operation 110.

If there is a cache hit and the detection type flag field 73 indicates parity is being used for the instruction stored in the cache instead of EDC/ECC as determined in decision 96, a determination in decision 98 is made of whether a force exception when parity is indicated for instruction (FEPI) mode is enabled as determined by the status of the FEPI bit field 84. If the FEPI mode is enable, then cache 26 generates an exception to CPU 30 in operation 106 when parity is indicated for the instruction stored in the cache line of the cache hit.

If no in decision 98, the FMPI bit field 83 is examined to determine whether cache 26 will force a cache miss in operation 102 or use parity checking of the instruction based on the stored parity bits in detection bits field 82 in operation 108. If there is a forced miss, in operation 102 cache control circuitry 38 signals the CPU 30 that there is a cache miss of the instruction and then fetches the instruction from memory 16 or 28. The fetched instruction is stored in a cache data field of the allocated cache line, and an EDC/ECC coding scheme is used to generate check bits from the instruction. The check bits are stored in the detection bits field 82 of the allocated cache line, and the detection flag (field 73) is set to indicate an EDC/ECC detection scheme.

If not in FMPI mode in decision 100, circuitry 38 performs parity checking on the information based on the stored parity bits in detection bits field 82 and provides the instruction to CPU 30 in operation 110.

In the embodiment of FIG. 6, the cache includes modes for instruction fetch cache hits where the instruction is protected in the cache by a parity encoding scheme. Implementing a forced exception when parity indicated mode and a force miss when parity indicated mode allows for a system that implements a higher reliability error checking scheme for instructions. This may provide for more reliable processor operations.

Figure 7:
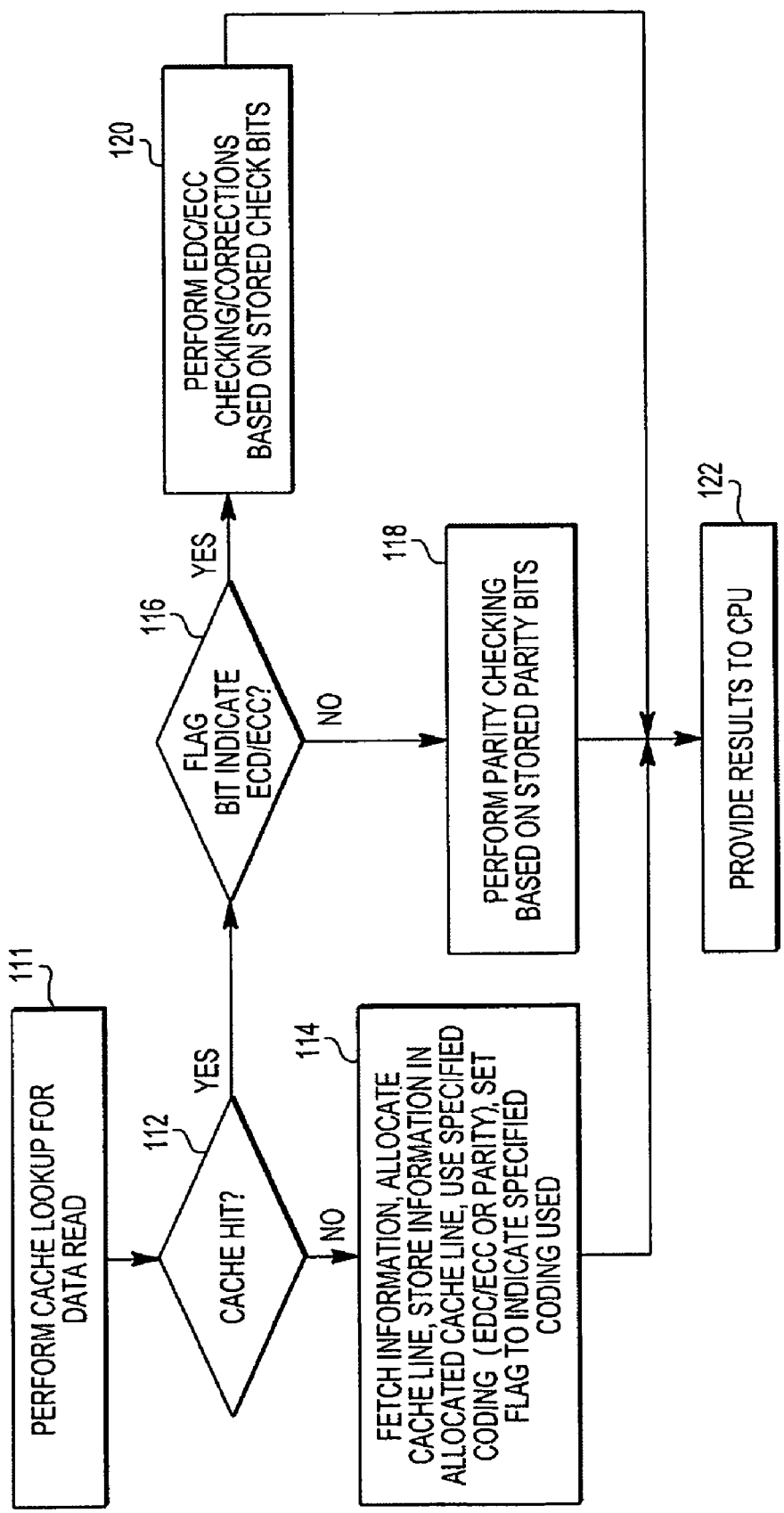
FIG. 7 illustrates a flow diagram of the operations of a data processing system for a cache lookup for a data read in accordance with one embodiment of the present invention.

FIG. 7 is a flow diagram showing operations for a cache lookup on a data read initiated by CPU 30. In one embodiment, these operations may be implemented by a data processing system that does not utilize FMPI and FEPI for an instruction fetch. In response to receiving a request for the data read, the control circuitry 38 in decision 112 determines whether the requested data is in the cache (a cache hit). If there is not a cache hit in decision 112, then CPU 30 fetches the data from memory 16 (or memory 28) in operation 114. Also in operation 114, a cache line of cache circuitry 21 is allocated and the information is stored in a cache data field of the allocated line. The cache may be configured such that either parity detection or EDC detection is implemented for the information stored in the cache on a data read miss. The appropriate type of detection bits (either parity for parity detection or check bits for EDC/ECC detection) are stored in the detection bits field 82 and the detection type flag (field 73) is set to either parity or EDC/ECC base on the type of error detection used for the data read miss. In some embodiments, cache control register 48 may include a bit for controlling cache 26 to use parity detection or EDC detection for data information stored in a cache. In other embodiments, the cache may use parity detection for some types of information, and EDC/ECC detection for other types of information. This determination may be hardwired, or may be user controlled, such as through a control field in cache control register 48, or elsewhere within data processing system 10.

If there is a cache hit of the data read, then the detection type flag field 73 of the line of the hitting way is examined in decision 116. If the flag indicates an EDC/ECC detection scheme, then the data is retrieved from the cache line and EDC detection (and ECC correction in some embodiments) is performed on the information using the check bits stored in the detection bits field 82 in operation 120. The data is then provided to CPU 30 in operation 122. If an EDC error occurs (or an uncorrectable ECC error occurs when using error correction in some embodiments), an error indication may be provided to CPU 30 via bus 24 by error control circuitry 66. If in decision 116 the flag is determined to indicate that parity detection is used, the information is retrieved from the cache and parity checking using the parity bits from the detection bits field 82 is performed on the data in operation 118. The data is then provided to CPU 30 in operation 122. If a parity error occurs, an error indication may be provided to CPU 30 via bus 24 by error control circuitry 66.

Figure 8:
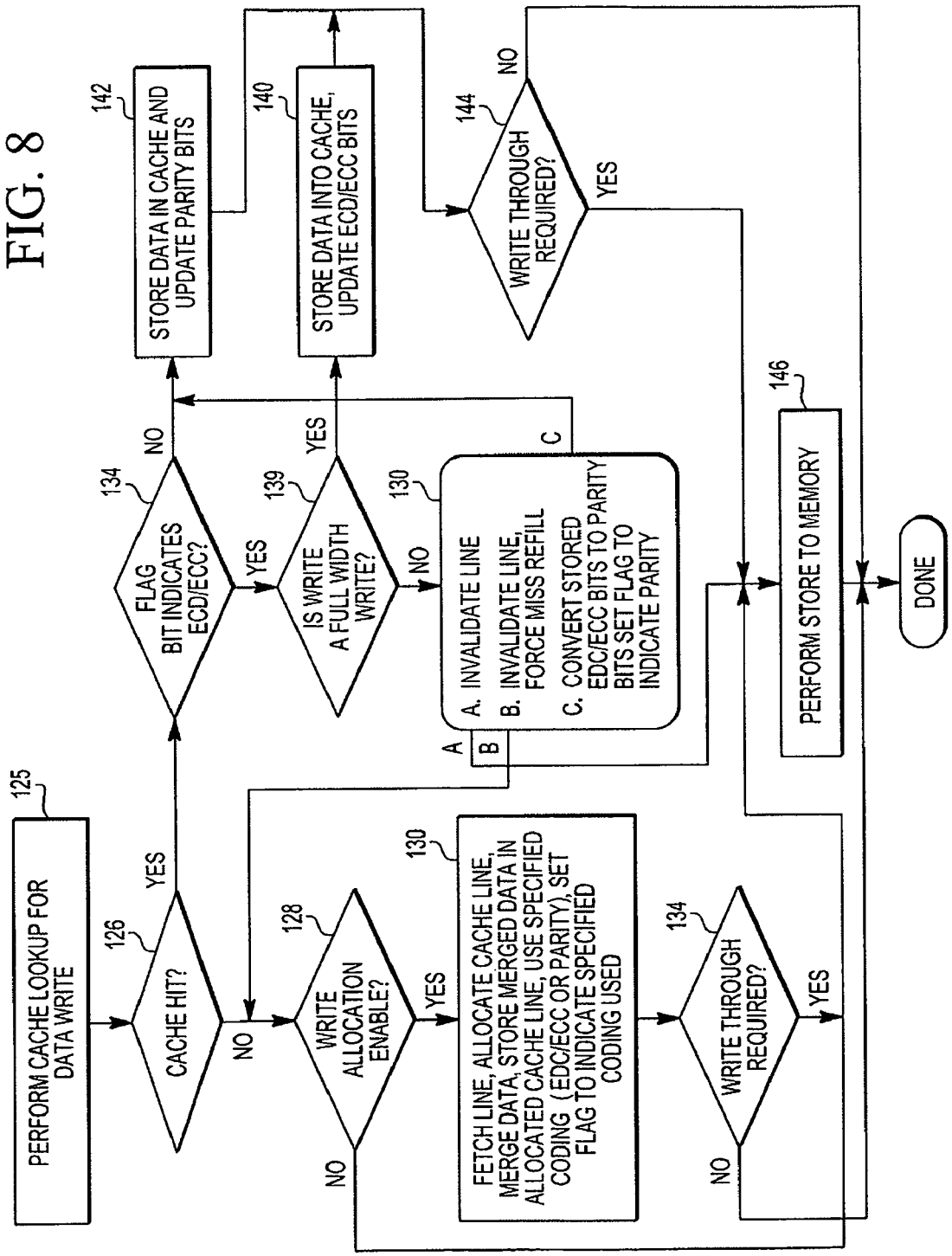
FIG. 8 illustrates a flow diagram of the operations of a data processing system for a cache lookup for a data write in accordance with one embodiment of the present invention.

FIG. 8 is a flow diagram showing operations for a cache lookup on a data write initiated by CPU 30. In response to receiving an indication of the data write, control circuitry 38 performs a cache look up for the information in operation 125. If there is a cache miss on the data write as determined in decision 126, control bit field 88 is examined in decision 128 to determine if write allocation is enabled for cache 26. If write allocation is not enabled as determined in decision 128, then the data is not written to the cache but is instead written to memory 16 or 28 in operation 146. If write allocation is enabled, then in operation 130, a cache line is allocated in cache 26, the line of data is fetched from memory 16 or 28, the modified data (the data of the data write) is then merged with the fetched data to form a modified line, and the modified line is stored in the allocated cache line. Also in operation 130, parity detection or EDC/ECC detection may be used to generate detection bits (either parity or EDC/ECC check bits) and those bits are stored in detection bit fields 82 of the cache line. The detection type flag field 73 is set to indicate which detection scheme is utilized. In one embodiment, when a data write miss occurs, parity checking is selected. In other embodiments, the particular detection scheme used may depend on the type, size, or address of the write data, or may be user configurable.

In decision 134, the write through bit field 86 is examined to determine if write through is required of the data written to cache 26. If write through is required, then the data is written to memory 16 or 28 in operation 146. If not, the data is not written through to memory 16 or 28.

If there is a cache hit in decision 126 and the stored detection type flag field 73 indicates that the data is protected in the cache by parity coding (as determined in decision 134), then modified data from CPU 30 is written to the cache line of the cache hit, and the parity bits stored in detection bits 82 for the data are updated to reflect the modified data in operation 142. The other data of the cache line does not have to be read since its not being modified. Because parity detection is being used, only the modified data is used to generate and update the parity bits associated with the data being modified, which may be partial data, such as a byte, halfword (two bytes), or word (four bytes). Accordingly, writing data to a cache (especially when its less than a full width write) with parity detection is more efficient than using EDC/ECC in that the entire data in the cache line corresponding to the EDC size granularity is not needed to be read and written back. If write through is required as determined in decision 144 by examining bit field 86, then the write data is written to memory 16 or 28 in operation 146. If no in decision 144, the process is complete.

If the detection type flag indicates in decision 134 that EDC/ECC detection of the cache line is utilized, a determination is made in decision 139 whether the data write is a full width write of the cache line. If the data write is a full width write (a full width write is the entire data corresponding to the granularity of the EDC/ECC coding, such as a 64-bit write when using eight check bits in a EDC/ECC coding scheme capable of detecting double-bit errors), then in operation 140, the data is stored in the hit cache line (the old data of the cache line is overwritten), new EDC/ECC check bits are generated using EDC/ECC coding, and the generated check bits are written to the detection bits field 82. If write through is required as determined in decision 144 by examining bit field 86, then the data is written to memory 16 or 28 in operation 146. If no in decision 144, the process is complete.

If the detection type flag field 73 for the hit line indicates EDC/ECC detection code and the write is less than a full width write as determined in decision 139, then cache 26 may implement different options in operation 130. In option A, the hit cache line would be invalidated in operation 130 and the data would be written to memory 16 or 28 in operation 146. In this case, no new EDC/ECC check bits are required to be generated, since the line is no longer valid in the cache. On a future lookup of the data, the line may be read back into the cache, and the error detection bits may be calculated as appropriate based on the flows described in FIGS. 6, 7 and 8. No read-modify-write operation is required in order to update stored EDC/ECC check bits. In option B, the hit line would be invalidated and a force miss refill would be performed where the process goes to decision 128. In this option, the line may be refilled prior to the next lookup of the data, and may be beneficial since a future cache miss may be avoided. In some embodiments, for option B, the refill of the line may not depend on the write allocation enable control bit, and the option B path from operation 130 is directed to operation 130 directly, such that the line is always refilled. On the refill, in one embodiment, the coding would be forced to be EDC/ECC, while in other embodiments, the coding would be selected as it normally would be in the case of a cache miss following the path from decision 126 to decision 128 to operation 130. In option C, the EDC/ECC checking bits would be converted to parity bits and the detection type flag would be set to indicate parity detection. This option allows the data to remain in the cache without a refill from memory, and essentially operates to "downgrade" the detection scheme dynamically for information stored in a cache line. This option may be the most efficient option for certain scenarios, particularly if the data has a short lifetime in the cache, but will be accessed frequently within that lifetime. Following operation 130, the process then goes to operation 142.

In one embodiment, a cache would be "hardwired" to perform only one of the three options. In other embodiments, the cache control register 48 may include a bit field to indicate which option is to take place.

In the embodiment shown, two of the three options (B and C) of operation 130 may utilize parity detection for data writes to a cache that are less than a full width write. Accordingly, such writes are more efficient in that they do not require all of the bits from the cache line to be read and new check bits generated from those read bits combined with the new write data. Such an operation requires a read-modify-write operation to the cache and may be either inefficient or overly complex. With parity checking, the bits that are not changed due to a cache write do not have to be read to generate the detection bits needed for the modified data of the data write. In cases where the write is a full width write, EDC/ECC checking can be used in that the existing data bits of the cache line do not need to be read since they will all be overwritten with a full width write.

By now it should be appreciated that there has been provided a cache having data storage units that is capable of implementing either parity or EDC/ECC detection for a data unit, based on a control field. In this manner, specific data units (e.g. a cache line) of a cache can operate using parity for single bit error detection or using EDC/ECC which allows for multi-bit error detection and correction (in some embodiments), if desired. Furthermore, the error detection scheme for each data unit may be changed during operation by dynamically changing the values of the detection type fields of the control register, resulting in additional flexibility.

Some of the above embodiments, as applicable, may be implemented using a variety of different information processing systems. For example, although FIG. 1 and the discussion thereof describe an exemplary data processing architecture, this exemplary architecture is presented merely to provide a useful reference in discussing various embodiments of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered or not exist in various other embodiments.

In one embodiment, data processing system 10 is a computer system such as a personal computer system. Other embodiments may include different types of computer systems. Computer systems are data handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones, and various other wireless devices. A typical computer system includes at least one processing unit, associated memory and a number of input/output (I/O) devices.

In one embodiment, a cache includes a plurality of cache lines, wherein each cache line includes a detection type field, a cache data field, and a tag field. Each detection type field is used to indicate an error detection scheme of a plurality of error detection schemes implemented for information in the cache data field. The cache includes cache control circuitry coupled to the plurality of cache lines. The cache control circuitry receives access addresses and uses the tag fields of the plurality of cache lines to determine whether each access address results in a hit or a miss in the cache.

Another embodiment includes a method of operating a cache including a plurality of cache lines. Each cache line of the plurality of cache lines includes a detection type field, a cache data field, and a detection field. A detection type field of a cache line indicates an error detection scheme of a plurality of error detection schemes currently in use for information stored in a cache data field of the cache line. The plurality of error detection schemes includes a multiple bit error detection scheme and a single bit error detection scheme. The method includes receiving a read access address corresponding to a read access of instruction type information and determining whether the read access address results in a hit or a miss in the cache. When the read access address results in a miss, allocating a cache line of the plurality of cache lines, fetching new information corresponding to the read access address from a memory, storing the new information into a cache data field of the allocated cache line, setting detection type field of the allocated cache line to indicate a multiple bit error detection scheme, generating one or more detection bits for the new information according to the multiple bit error detection scheme, and storing the one or more detection bits in a detection field of the allocated cache line. The method includes when the read access address results in a hit and when the detection type field of the cache line which resulted in the hit indicates the multiple bit error detection scheme, performing multiple bit error checking on information from a cache data field of the cache line which resulted in the hit using information of the detection field of the cache line which resulted in the hit.

Another embodiment includes a method of operating a cache including a plurality of cache lines. Each cache line of the plurality of cache lines includes a detection type field, a cache data field, and a detection field. A detection type field of a cache line indicates an error detection scheme of a plurality of error detection schemes currently in use for information stored in a cache data field of the cache line. The plurality of error detection schemes includes a multiple bit error detection scheme and a single bit error detection scheme. The method includes receiving a read access address corresponding to a read access of information and determining whether the read access address results in a hit or a miss in the cache. The method includes when the read access address results in a miss, allocating a cache line of the plurality of cache lines, fetching new information corresponding to the read access address from a memory, storing the new information into a cache data field of the allocated cache line, setting a detection type field of the allocated cache line to indicate a multiple bit error detection scheme or the single bit error detection scheme to be used for the new information, generating one or more detection bits for the new information according to the multiple bit error detection scheme or the single bit error detection scheme to be used, and storing the one or more detection bits in a detection field of the allocated cache line.

Another embodiment includes a method of operating a cache including a plurality of cache lines. Each cache line of the plurality of cache lines includes a detection type field, a cache data field, and a detection field. A detection type field of a cache line indicates an error detection scheme of a plurality of error detection schemes currently in use for information stored in a cache data field of the cache line. The plurality of error detection schemes includes a multiple bit error detection scheme and a single bit error detection scheme. The method includes receiving a write access address corresponding to a write access of data type information and determining whether the write access address results in a hit or a miss in the cache. The method includes when the write access address results in a miss, identifying a cache line of the plurality of cache lines, storing received data corresponding to the write access address into a cache data field of the identified cache line, setting a detection type field of the identified cache line to indicate a multiple bit error detection scheme or a single bit error detection scheme to be used, generating one or more detection bits for the received cache data according to the multiple bit error detection scheme or the single bit error detection scheme to be used, and storing the one or more detection bits in a detection field of the identified cache line.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A cache comprising:
   a plurality of cache lines, wherein each cache line includes a detection type field, a cache data field, and a tag field, wherein each detection type field is used to indicate an error detection scheme of a plurality of error detection schemes implemented for information in the cache data field; and
   cache control circuitry coupled to the plurality of cache lines, wherein the cache control circuitry receives access addresses and uses the tag fields of the plurality of cache lines to determine whether each access address results in a hit or a miss in the cache.

2. The cache of claim 1, further comprising:
   wherein each cache line of the plurality of cache lines includes a detection field, and wherein each detection type field indicates whether information stored in the detection field is used for detecting single bit errors in the information of the associated cache data field of the cache line or multiple bit errors in the information of the cache data field of the associated cache line.

3. The cache of claim 1, wherein the cache control circuitry, in response to a received access address resulting in a miss, allocates a cache line of the plurality of cache lines to store received information corresponding to the received access address and uses a type of the received access address to determine how to set a detection type field of the allocated cache line.

4. The cache of claim 3, wherein:
   when the received access address resulting in the miss corresponds to an access of data type information, the cache control circuitry sets the detection type field to indicate that a single bit error detection scheme is to be used for error detection of the received information stored in the allocated cache line, and
   when the received access address resulting in the miss corresponds to an access of instruction type information, the cache control circuitry sets the detection type field to indicate that a multiple bit error detection scheme is to be used for error detection of the received information stored in the allocated cache line.

5. The cache of claim 3, wherein:
   when the received access address resulting in the miss corresponds to a read access of data type information, the cache control circuitry sets the detection type field to indicate that a multiple bit error detection scheme is to be used for error detection of the received information stored in the allocated cache line, and when the received access address resulting in the miss correspond to a write access of data type information and allocation on write access misses is enabled, the cache control circuitry sets the detection type field to indicate that a single bit error detection scheme is to be used for error detection of the received information stored in the allocated cache line.

6. The cache of claim 3, wherein when the received access address resulting in the miss corresponds to a read access, the cache control circuitry sets the detection type field to indicate that a multiple bit error detection scheme is to be used for error detection of the received information stored in the allocated cache line.

7. The cache of claim 1, wherein the cache control circuitry, in response to a received read access address resulting in a hit, uses information in the detection type field of a cache line which resulted in the hit to determine what error correction scheme to apply to information stored in a data cache field of the cache line which resulted in the hit.

8. A method of operating a cache including a plurality of cache lines, wherein each cache line of the plurality of cache lines includes a detection type field, a cache data field, and a detection field, wherein a detection type field of a cache line indicates an error detection scheme of a plurality of error detection schemes currently in use for information stored in a cache data field of the cache line, wherein the plurality of error detection schemes includes a multiple bit error detection scheme and a single bit error detection scheme, the method comprising:

receiving a read access address corresponding to a read access of instruction type information;

determining whether the read access address results in a hit or a miss in the cache;

when the read access address results in a miss, allocating a cache line of the plurality of cache lines, fetching new information corresponding to the read access address from a memory, storing the new information into a cache data field of the allocated cache line, setting a detection type field of the allocated cache line to indicate a multiple bit error detection scheme, generating one or more detection bits for the new information according to the multiple bit error detection scheme, and storing the one or more detection bits in a detection field of the allocated cache line; and when the read access address results in a hit and when the detection type field of the cache line which resulted in the hit indicates the multiple bit error detection scheme, performing multiple bit error checking on information from a cache data field of the cache line which resulted in the hit using information of the detection field of the cache line which resulted in the hit.

9. The method of claim 8, wherein when the read access address results in a hit and the detection type field of the cache line which resulted in the hit indicates the single bit error detection scheme:

forcing a miss, fetching new information corresponding to the read access address from memory, storing the new information into a cache data field of the cache line which resulted in the hit, setting the detection type field of the cache line which resulted in the hit to indicate the multiple bit error detection scheme, generating one or more detection bits for the new information according to the multiple bit error detection scheme, and storing the one or more detection bits in a detection field of the cache line which resulted in the hit.

10. The method of claim 8, wherein when the read access address results in a hit and a detection type field of the cache line which resulted in the hit indicates a single bit error detection scheme, forcing an exception.

11. The method of claim 8, wherein when the read access address results in a hit and a detection type field of the cache line which resulted in the hit indicates a single bit error detection scheme, perform parity checking on information from a cache data field of the cache line which resulted in the hit using the using information from a detection field of the cache line which resulted in the hit.

12. The method of claim 8, wherein when the read access address results in a hit and information in a detection type field of the cache line which resulted in the hit indicates a multiple bit error detection scheme, the method further comprises:

correcting information from a cache data field of the cache line which resulted in the hit if the performing multiple bit error checking indicates an error.

13. A method of operating a cache including a plurality of cache lines, wherein each cache line of the plurality of cache lines includes a detection type field, a cache data field, and a detection field, wherein a detection type field of a cache line indicates an error detection scheme of a plurality of error detection schemes currently in use for information stored in a cache data field of the cache line, wherein the plurality of error detection schemes includes a multiple bit error detection scheme and a single bit error detection scheme, the method comprising:

receiving a read access address corresponding to a read access of information;

determining whether the read access address results in a hit or a miss in the cache; and when the read access address results in a miss, allocating a cache line of the plurality of cache lines, fetching new information corresponding to the read access address from a memory, storing the new information into a cache data field of the allocated cache line, setting a detection type field of the allocated cache line to indicate a multiple bit error detection scheme or the single bit error detection scheme to be used for the new information, generating one or more detection bits for the new information according to the multiple bit error detection scheme or the single bit error detection scheme to be used, and storing the one or more detection bits in a detection field of the allocated cache line.

14. The method of claim 13, further comprising:

when the read access address results in a hit and a detection type field of the cache line which resulted in the hit indicates a multiple bit error detection scheme, performing multiple bit error checking on information from a cache data field of the cache line which resulted in the hit using information from a detection field of the cache line which resulted in the hit; and when the read access address results in a hit and the detection type field of the cache line which resulted in the hit indicates a single bit error detection scheme, performing single bit error checking on information from a cache data field of the cache line which resulted in the hit using information from the detection field of the cache line which resulted in the hit.

15. The method of claim 13, wherein when a detection type field of a particular cache line indicates the multiple bit error detection scheme, the detection field of the particular cache line includes error detection code (EDC) or error correction code (ECC) check bits for information in a cache data field of the particular cache line, and when the detection type field of the particular cache line indicates a single bit error detection scheme, the corresponding detection field of the particular cache line includes at least one parity bit for the information in the cache data field of the particular cache line.

16. A method of operating a cache including a plurality of cache lines, wherein each cache line of the plurality of cache lines includes a detection type field, a cache data field, and a detection field, wherein a detection type field of a cache line indicates an error detection scheme of a plurality of error detection schemes currently in use for information stored in a cache data field of the cache line, wherein the plurality of error detection schemes includes a multiple bit error detection scheme and a single bit error detection scheme, the method comprising:

receiving a write access address corresponding to a write access of data type information;

determining whether the write access address results in a hit or a miss in the cache; and when the write access address results in a miss, identifying a cache line of the plurality of cache lines, storing received data corresponding to the write access address into a cache data field of the identified cache line, setting a detection type field of the identified cache line to indicate a multiple bit error detection scheme or a single bit error detection scheme to be used, generating one or more detection bits for the received cache data according to the multiple bit error detection scheme or the single bit error detection scheme to be used, and storing the one or more detection bits in a detection field of the identified cache line.

17. The method of claim 16, further comprising:

when the write access address results in a hit, a detection type field of the cache line which resulted in the hit indicates a multiple bit error detection scheme, and the write access is a full width write access, storing received data corresponding to the write access address into a cache data field of the cache line which resulted in the hit and updating a detection field of the cache line which resulted in the hit according to the multiple bit error detection scheme.

18. The method or claim 16, further comprising:

when the write access address results in a hit and a detection type field of the cache line which resulted in the hit indicates a multiple bit error detection scheme, invalidating the cache line which resulted in the hit.

19. The method or claim 18, wherein when the write access address results in a hit and a detection type field of the cache line which resulted in the hit indicates a multiple bit error detection scheme, the method further includes forcing a cache miss in response to the write access address, and processing the cache miss.

20. The method or claim 16, further comprising:

when the write access address results in a hit and the detection type field of the cache line which resulted in the hit indicates a multiple bit error detection scheme, storing received data corresponding to the write access address to a cache data field of the cache line which resulted in the hit, generating one or more detection bits for the received data according to a single bit error detection scheme, and storing the generated one or more detection bits in the corresponding detection field of the cache line which resulted in the hit.

* * * * *